(12) United States Patent
Stevens

(10) Patent No.: X3849
(45) Date of Patent: Apr. 16, 1824

(54) FORK, FOUR TINED

(76) Inventor: Martin Stevens

Martin Stephens
Letters Patent

The Schedule referred to in these Letters Patent and making part of the same containing a description in the words of the said Martin Stevens himself of his improvement in the mode of making "Steel Dung Forks with four or more tines without rivet or welding out of a solid bar of Steel"

To all persons to whom these presents shall come: Martin Stevens of Waterbury in the County of New Haven and state of Connecticut, and a Citizen of the United States, mechanic, sends greeting:

Be it known that I the said Martin Stevens have invented constructed made and applied to use a new and useful improvement in the mode of making or manufacturing "Steel dung Forks with four or more tines without reviting or welding, out of a solid bar of Steel called the four tined Steel dung Fork" which said improvement is specified in the words following viz.

Martin Stevens's improved method of making a Steel dung fork with four or more tines without reviting or welding Take a bar of Steel of sufficient size to make a fork of four or more tines: see that it is solid and without flaws when properly heated split it into three parts leaving a piece at the end of the bat sufficient for the shank. The two outside tines split of sufficient size to make a suitable sized tine when drawn and draw them out in the common manner. Then draw out the part of the bar left for the middle tine and while drawn, split it for the two middle tines; heat them and hammer and shape them fit for finishing: then separate at the heel the tines by a wedge or hammering as is most convenient, and shape the whole fork in the manner most convenient for use then give the fork a spring temper in the common manner of the spring temper pitch forks In this manner a fork of four or more tines may be made without welding or riveting on any tines and without subjecting the steel to a welding heat which much injures it and the fork when made is perfectly sound and strong and fit for use and may be used to remove manure dig potatoes, dig garden and for many other important purposes The bar of steel may be in the first place split into as many parts as it is intended to make tines or prongs to the fork and may be then drawn out in the above manner or in any other most convenient and the fork be made in like manner without riviting or welding

What I claim as my invention is the method of making a steel dung fork with four or more tines out of a solid bar of steel without welding and without riviting on any of the tines or prongs A fork may be thus made much cheaper and is more valuable when made.

In testimony that the above is a true specification of my said improvement as above described I have hereto set my hand & seal the fourth day of October A.D. 1828

S P Staples } Witnesses Martin Stevens Exd
J S Hitchcock }
HCB

660 Recd & Recorded [illegible] 17th Dec 1831

2—328 a.

DRAFTSMAN'S DIVISION.

*All communications should be addressed to*
"The Commissioner of Patents.
Washington, D. C."

*DEPARTMENT OF THE INTERIOR,*

United States Patent Office,

*Washington, D. C.,* ........................., *189*...

*SIR:*

*The printed* copies ....... *of Patent No.* M Stevens
are *exhausted.* Apr 16 1824

*As soon as printed a copy will be mailed you to complete your order.*

*By direction of the Commissioner:*

*Very respectfully,*

*Chief Clerk.*

81431-6-97-5m